(12) United States Patent
O'Sullivan et al.

(10) Patent No.: US 8,171,348 B2
(45) Date of Patent: May 1, 2012

(54) DATA CONSISTENCY IN LONG-RUNNING PROCESSES

(75) Inventors: Patrick J. O'Sullivan, Dublin (IE);
Gregory Sechuga, Westfield, IN (US);
Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 12/470,693

(22) Filed: May 22, 2009

(65) Prior Publication Data

US 2010/0299554 A1    Nov. 25, 2010

(51) Int. Cl.
*G06F 11/00* (2006.01)
(52) U.S. Cl. .................... 714/47.1; 714/46; 714/57
(58) Field of Classification Search .............. 714/46, 714/47, 57, 47.1
See application file for complete search history.

(56) References Cited

U.S. PATENT DOCUMENTS

| | | | |
|---|---|---|---|
| 6,255,943 B1 * | 7/2001 | Lewis et al. | 340/506 |
| 6,467,050 B1 * | 10/2002 | Keung | 714/27 |
| 6,851,070 B1 | 2/2005 | Rodrigues et al. | |
| 6,892,317 B1 * | 5/2005 | Sampath et al. | 714/4 |
| 7,165,188 B1 | 1/2007 | Rodrigues et al. | |
| 7,509,519 B2 * | 3/2009 | Srivastava et al. | 714/4 |
| 7,730,364 B2 * | 6/2010 | Chang et al. | 714/47 |
| 2003/0046615 A1 * | 3/2003 | Stone | 714/47 |
| 2003/0093500 A1 * | 5/2003 | Khodabakchian et al. | 709/219 |
| 2005/0160318 A1 * | 7/2005 | Di Luoffo et al. | 714/25 |
| 2006/0004548 A1 * | 1/2006 | Santos et al. | 703/1 |
| 2006/0010234 A1 * | 1/2006 | Reedy et al. | 709/224 |
| 2006/0041794 A1 * | 2/2006 | Aaron | 714/47 |
| 2007/0101183 A1 | 5/2007 | Rodrigues et al. | |
| 2008/0059964 A1 | 3/2008 | Khodabakchian et al. | |
| 2008/0071787 A1 | 3/2008 | Ramachandran | |
| 2008/0098108 A1 | 4/2008 | Yu | |

OTHER PUBLICATIONS

Banker's algorithm; Wikipedia; Jan. 20, 2009 (last modification); en.wikipedia.org/wiki/Banker%27s_algorithm.

* cited by examiner

*Primary Examiner* — Joshua Lohn
(74) *Attorney, Agent, or Firm* — Stevens & Showalter LLP

(57) ABSTRACT

Long running computer implemented processes are dynamically adapted to improve data consistency. A range of process steps in a long running computer implemented process is specified. Additionally, each of the computer-implemented process partners that are associated with the execution of the long running process are identified within the range of specified process steps. Monitoring information is also collected with regard to at least one identified process partner. An automatic determination is made as to whether each monitored process partner is available before initiating execution of the specified range of process steps in an instance of the long running computer implemented process and a flow of the long running computer implemented process is transformed based at least in part upon the determination as to whether each monitored process partner is available.

20 Claims, 9 Drawing Sheets

DATA CONSISTENCY IN LONG-RUNNING PROCESSES

BACKGROUND

The present invention relates to the improvement of data consistency, and in particular, to enhancements of process server functionality and tools for manipulating process server functionality to improve data consistency in long-running processes.

Typically, a computer executed process may be considered "long running" if the time required to execute the process step(s) takes more than a few seconds. Data consistency can pose a potential problem for such long running computer processes, especially where a long running process must involve multiple systems and/or span multiple transactions. As an illustration, a communication failure might occur during a long running process such that a database update on a first system is successful, whereas a database update on a second system fails, thus resulting in an inconsistent state among databases in different systems. In another illustration, a database update on a first system may be successful, whereas a database update on a second system may fail because an infrastructure supporting the database on the second system is unavailable, which also results in an inconsistent state among databases in the different systems.

Software such as Business Process Management applications may attempt to address general data consistency issues. For example, in the event of a detected fault that is encountered during execution of a process, the Business Process Management application may attempt to implement a corrective action. Likewise, the Business Process Management application may execute compensation actions for all successfully completed activities. However, conventional Business Process Management applications have limited capability in responding to detected faults, especially faults that occur during the execution of long running processes. Moreover, the Business Process Management application may not be able to augment the necessary databases or otherwise remedy the failure, especially where the updated system has triggered another process such that the inconsistency has been propagated through additional systems and databases.

Even where it is possible to respond to a general data inconsistency issue by returning all participating systems to a consistent state, the compensation mechanisms take time to complete. Thus, such compensation mechanisms contribute negatively to the overall business process quality of service.

BRIEF SUMMARY

According to various aspects of the present invention, a method of dynamically adapting long running computer implemented processes is provided. The method may be implemented, for example, by a process server. The method comprises receiving at a process server computer, a specification of a range of process steps in a long running computer implemented process that carries out at least a portion of an associated business workflow, wherein the long running process is designed for execution in a corresponding computing environment. The method further comprises receiving at the process server computer, an identification of computer-implemented process partners that are associated with the execution of the long running process within the range of specified process steps and receiving monitoring information at the process server computer, which is collected with regard to at least one identified process partner.

The method still further comprises determining whether each monitored process partner is available for providing a service via data communication before initiating execution of the specified range of process steps in an instance of the long running computer implemented process and transforming a flow of the long running computer implemented process based at least in part upon the determination as to whether each monitored process partner is available for providing a service via data communication.

Transformation of the flow of the long running computer implemented process may include implementing a completion action, e.g., executing the long running process, if the process partners associated with the execution of the long running process within the range of specified process steps are available. Correspondingly, transformation of the flow of the long running computer implemented process may include implementing a trigger action that automatically modifies the flow of the long running process to not execute the specified range of process steps if at least one process partner associated with the specified range of process steps is unavailable.

According to still further aspects of the present invention, a computer program product is provided, to dynamically adapt long running computer implemented processes. The computer program product comprises a computer usable storage medium having computer usable program code embodied therewith, the computer usable program code comprising computer usable program code configured to receive a specification of a range of process steps in a long running computer implemented process, where the long running process is designed for execution by a process server computer operating in a corresponding computing environment.

The computer program product further comprises computer readable program code configured to receive identification of computer-implemented process partners that are associated with the execution of the long running process within the range of specified process steps and computer readable program code configured to receive monitoring information collected with regard to at least one identified process partner.

The computer program product still further comprises computer readable program code configured to determine whether each monitored process partner is available before initiating execution of the specified range of process steps in an instance of the long running computer implemented process and computer readable program code configured to transform a flow of the long running computer implemented process based at least in part upon the determination as to whether each monitored process partner is available.

The program code configured to transform the flow of the long running computer implemented process includes computer readable program code configured to implement a completion action such as executing the long running process, if the process partners associated with the execution of the long running process within the range of specified process steps are available. The program code configured to transform the flow of the long running computer implemented process also includes computer readable program code configured to implement a trigger action that automatically modifies the flow of the long running process to not execute the specified range of process steps if at least one process partner associated with the specified range of process steps is unavailable.

DETAILED DESCRIPTION

According to various aspects of the present invention, enhancements of process server functionality are provided by adding or otherwise integrating a product configuration feature with a software product such as a Business Process Management application executed by a process server. The product configuration feature allows a user such as a process designer to specify a range of process steps in a long running computer implemented process executed by the software product and designate that the specified range of process steps should not start execution if one or more process partners associated with the range of process steps is unavailable. This product configuration feature may integrate with or may otherwise be combined with the utilization of one or more application and/or system monitoring products to determine availability of the process partners in deciding whether to start the range of processing steps in an instance of the associated long running process.

Figure 1:
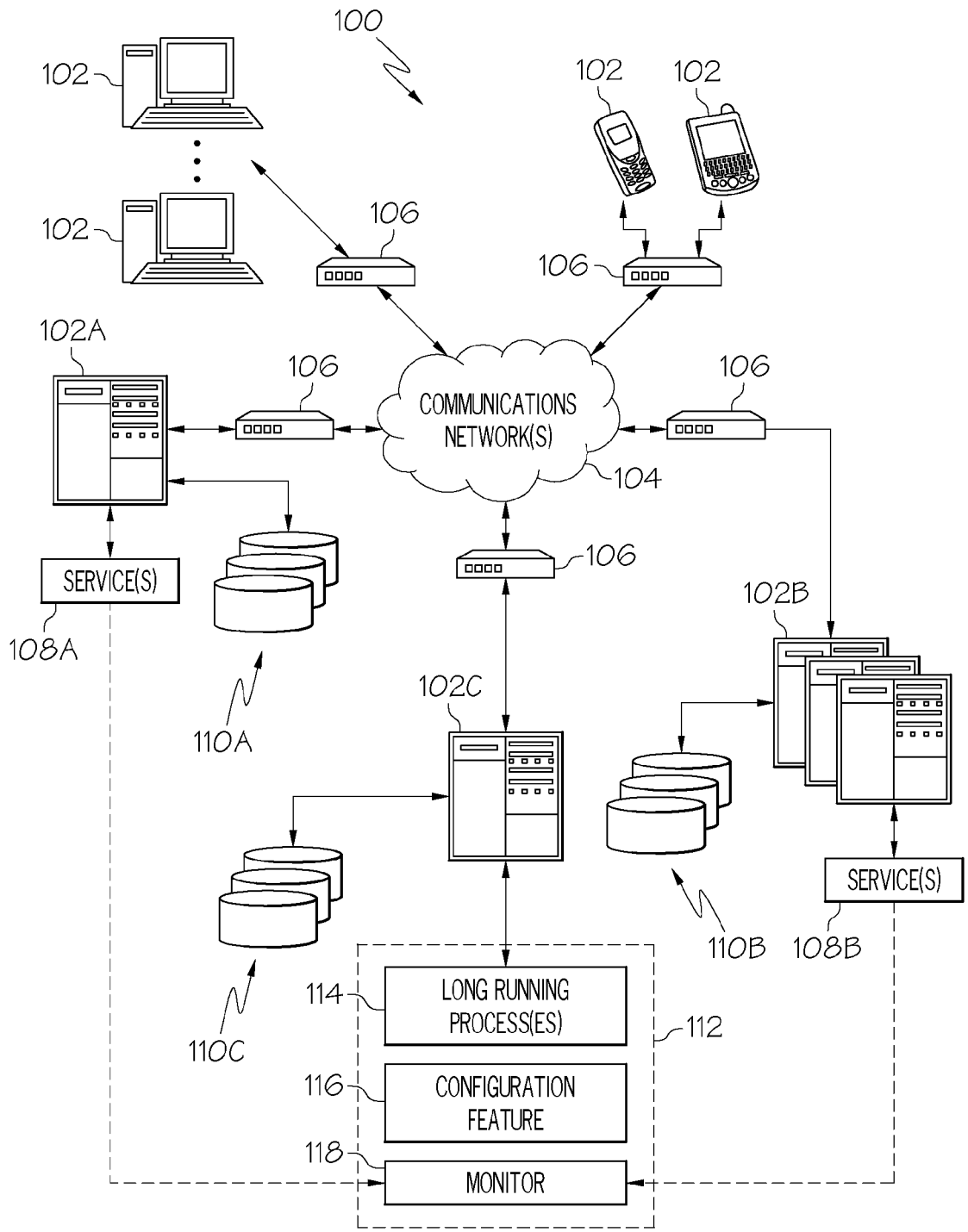
FIG. 1 is a system diagram having components for improving the consistency of long running processes according to various aspects of the present invention.

Referring now to the drawings and particularly to FIG. 1, a general diagram of an exemplary computing environment 100 is illustrated, which is capable of carrying out aspects of the present invention. The environment 100 comprises a plurality of processing devices, designated in general by the reference numeral 102, that are linked together by at least one network 104. Typical processing devices 102 may include servers, personal computers, notebook computers, transactional systems, appliance or pervasive computing devices such as a personal data assistant (PDA), palm computers, cellular access processing devices, special purpose computing devices, printing and imaging devices, facsimile devices, storage devices and/or other devices capable of communicating over the network 104.

The network 104 provides communications links between the various processing devices 102, and may be supported by networking components 106 that interconnect the processing devices 102, including for example, routers, switches, hubs, firewalls, network interfaces wired or wireless communications links and corresponding interconnections. Moreover, the network 104 may comprise connections using one or more intranets, extranets, local area networks (LAN), wide area networks (WAN), wireless networks (WIFI), the internet, including the world wide web, and/or other arrangements for enabling communication between the processing devices 102, in either real time or otherwise, e.g., via time shifting, batch processing, etc.

For speed of communications and cost effectiveness, individuals, businesses, and other organizations frequently exchange electronic data through the network 104. For example, select processing devices 102, further designated 102A and 102B in this example, may be implemented as application-based server computers that are utilized by entities referred to as Web Service Providers to host Web services 108A, 108B respectively. Web services, designated 108 generally, can be utilized singly or collectively to accomplish a wide range of intended purposes. Such Web services 108 can interact with various data sources 110 and/or interact with other Web services 108, which may be local or located across the network 104 hosted by other application-based server computers. Accordingly, businesses may utilize the network 104 to loosely couple selected Web services 108 provided by unrelated, third party sources, to accomplish various processes, such as desired business workflows.

By way of illustration, and not by way of limitation, assume that a processing device further designated 102C, implements an application 112 that comprises at least one long running process 114. Further assume that the long running process 114 performed by the application 112 chains together one or more Web services, e.g., 108A, 108B from one or more application-based server computers. In this regard, the Web services 108 that are chained together to implement the process define process partners, and these process partners may be locally maintained, or one or more chained process partners may reside on different servers and/or may be provided by separate entities, such as is illustrated by Web service 110A and Web service 110B.

The coupling of Web services is advantageous to businesses because Web services provide heterogeneous systems that can be integrated into cross-functional, multi-company applications. However, assume for example, that the long running process 114 requires activity by both Web service 108A and Web service 108B for complete and proper execution. If one or more of the Web services 108A, 108B is unavailable, unresponsive, not capable of performing at a required level of service, etc., or if there is a communications problem in communicating with the Web services during the execution of the long running process 114, it is possible that ambiguity in the data may result, e.g., where different databases, e.g., database 110B at server 108B is different from data in the databases 110C at server 108C. This ambiguity may be difficult to reconcile, especially where intervening processing changes the underlying data. Still further, complications in data management may occur, where for example, a subsequent process detrimentally relies upon the integrity of the data in the database 110, which is 4unreliable in view of the ambiguity in the databases at servers 102A, 102B and 102C.

However, according to aspects of the present invention, the application 112 has been augmented by a configuration feature 116. The configuration feature 116 enables a process designer to specify that an instance of the long running process 114 (or a specified range thereof) must not begin until all process partners associated with the long running process 114 (or specified range) are available. Thus, in the above-illustrative example, a process designer may specify that an instance of the long running process 114 must not begin unless and/or until all process partners associated with the long running process 114, e.g., Web services 108(A) and 108(B), are available in the simple, exemplary illustration. Correspondingly, the execution of an instance of a long-running process may be dynamically altered depending upon the availability of process partners associated with the long running process or specified range thereof, as will be described in greater detail herein.

The utilization of process partners according to various aspects of the invention herein, is not limited to Web services, per se. Rather, process partners may comprise any combination of services (local or remote), Web services, applications, processes, and other features necessary to implement the functionality of the long running process 114.

According to further aspects of the present invention, in an alternative exemplary configuration, the process designer may specify a range of process steps within the long running process 114. Under this arrangement, the system may be configured such that the specified range of process steps within the long running process 114 will not begin execution unless all process partners associated with that specified range of process steps are available.

Accordingly, various aspects of the present invention provide tools and/or capabilities that avoid situations in long running processes, e.g., that require compensation executed with multiple process partners and/or complex process state and data inconsistency tracking, that result in data inconsistency if a failure occurs in the execution of a corresponding long running process. Data inconsistency may be avoided as set out in greater detail herein, by preventing execution of a specified range of process steps if one or more process partners associated with the range of process steps is unavailable.

According to various aspects of the present invention, the application 112 may comprise a Business Process Management application. In this regard, the Business Process Management application may be supported by a framework such as IBM® WebSphere® Process Server. IBM and WebSphere are trademarks of International Business Machines in the United States, other countries or both. The framework may also comprise development tools such as the WebSphere Integration Developer and/or WebSphere Business Modeler, all by International Business Machines, of Armonk N.Y. Still further, various aspects of the present invention may be integrated with or otherwise provide information to monitoring applications, including dashboards and other system monitoring tools. By way of illustration, a dashboard may provide a visual metaphor to designate when a process has been dynamically altered according to aspects of the present invention, e.g., when a decision is made to either execute a long running process, or not execute a long running process as set out in greater detail herein. An exemplary monitoring application comprises Websphere Business Monitor by International Business Machines, of Armonk N.Y.

According to further aspects of the present invention, monitors 118 may be utilized to provide feedback, e.g., for specifying whether a corresponding monitored component, e.g., a process partner, is available. The feedback may alternatively provide information from which a determination may be made, as to whether an associated process partner is available, e.g., based upon rules processing, policy checks, etc. As a few illustrative examples, information collected by a select one or more of the monitors 118 may be fed back to one or more of: the application 112, e.g., via the running process 114, a corresponding framework hosting the the long running process 114, both the application 112 and the framework, the application 112 and the associated framework in some combination, etc.

Thus, in an exemplary implementation, a Business Process Management framework may collect performance and/or availability information from the monitor(s) 118 to provide information about the status of process partners to the application 112, e.g., at run-time. However, monitoring is not limited to run-time monitoring, or to any other point in time. Rather, an implementation may be capable of periodic monitoring, continuous monitoring, sporadic monitoring, monitoring driven by rules or policies etc. Similarly, a determination as to whether each monitored process partner is available before initiating execution of the specified range of process steps in an instance of the long running computer implemented process need not occur at runtime before execution of the range of process steps. Rather, the decision may be made any reasonable time before beginning the execution of the identified range of process steps.

As noted in greater detail above, the configuration feature 116 provides a configuration that enables the application to avoid the execution of the long running process 114 or selected process steps thereof, if a required component is unavailable. As such, various aspects of the present invention provide a system that is proactive in avoiding data inconsistencies by preventing execution of the long running processes in case of unavailability of the process partners, e.g., Web services or other features that are unavailable.

By way of illustration and not by way of limitation, assume that a process designer specifies a range of processing steps within the long running process 114 that include chaining of Web service 108A into Web service 108B. Further, assume that at run-time or some earlier time, the monitor 118 reports that Web service 108B is unavailable. Under this arrangement, the application 112, may avoid instantiating an instance of the long running process 114. Alternatively, the application can begin execution of the long running process 114, but implement an action such as a wait process before beginning execution of the process steps in the range specified by the process designer, even though Web service 108A is available. By proactively taking action, the system avoids the potential for data inconsistency that may occur as a result of the unavailability of Web service 108B. For example, potential ambiguity between datasets in databases 110A, 110B and 110C is avoided because the identified range of process steps is not started. When Web service 108B becomes available, the execution of the process steps may resume. Otherwise, the system may take alternative actions, examples of which are described in greater detail herein. Still further, if information provided by the monitor(s) 118 indicates that there are no problems with process partners, the normal execution of the application, including the long running process 114 may be implemented.

Exemplary monitors 118 may comprise, for example, one or more products from the IBM Tivoli® Monitoring family of products, by International Business Machines of Armonk N.Y. Tivoli is a trademark of International Business Machines in the United States, other countries or both.

Figure 2:
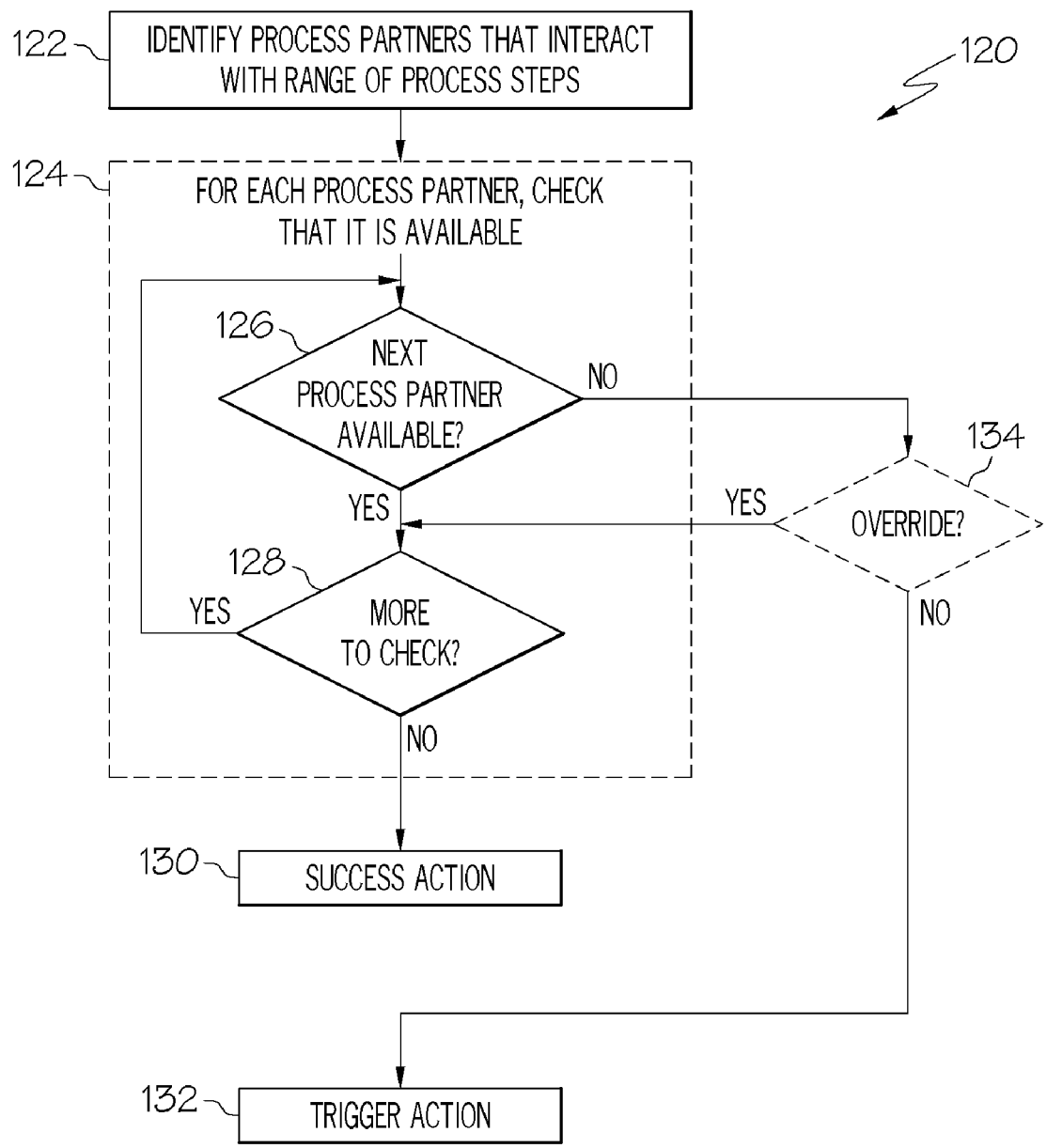
FIG. 2 is a flow chart illustrating a method of improving the consistency of long running processes according to various aspects of the present invention.

Referring to FIG. 2, a method 120 is illustrated for checking availability of process partners, such as components, services, Web services and other features according to various aspects of the present invention. This method may be implemented, for example, at run time or before run time to determine whether it is okay to execute a long running process or a specified subsection thereof (a specified range of process steps). The method 120 comprises identifying process partners that interact with a process or a specified range of the process at 122. A check is then made at 124 to determine whether each identified process partner is available.

For example, a decision may be made at 126 as to whether a next process partner is available. If the checked process partner is available, then a decision is made at 128 as to whether there are more process partners to check. If there are more process partners to check, the method loops back to consider the next process partner at 126. If there are no more process partners to check and all identified process partners are available, then a completion action is implemented at 130. For example, the completion action may simply return control to the workflow for execution of the process instance or specified range of steps within the process instance.

According to various aspects of the present invention, if the decision at 126 results in a determination that at least one process partner is not available, a trigger action may be implemented at 132. For example, the method 120 may return an event code or other response to the process instance, framework, or other controlling logic to indicate that at least one process partner is unavailable. As further examples, the trigger action 132 may attempt to resolve the unavailability circumstance, e.g., by implementing and/or extending a "wait period" to see if the unavailable process partner becomes available. The trigger action 132 may also take additional and/or alternative actions, such as to attempt to locate an alternative to the unavailable process partner. Still further, the trigger action 132 may implement any other remediation.

As yet another example, an optional override may be provided. For example, if a decision is made at 126 that a process partner is unavailable, an optional decision may be made at 134 as to whether the unavailability of the process partner should override the trigger action 132. For example, if a decision is made to override the unavailability of a particular process partner, control can return to 128. In this regard, the decision to override may be based upon a number of factors.

Moreover, authorization may be required to successfully implement an override. In this regard, the authorization to override may be implemented in any number of ways. For example, an override may require a human operator authorization. Still further, an override may require an authorization from select individuals, e.g., those with management or supervisory authority. Still further, the decision to override may be based upon rules, e.g., time of day rules, hierarchical priorities, or any other approach desired to establish parameters for allowing the override. By way of illustration, a system administrator may override a rule to not start a process instance or range of process steps despite a particular process partner being unavailable. The action of the system administrator may further be implemented after the process application is deployed.

Figure 3:
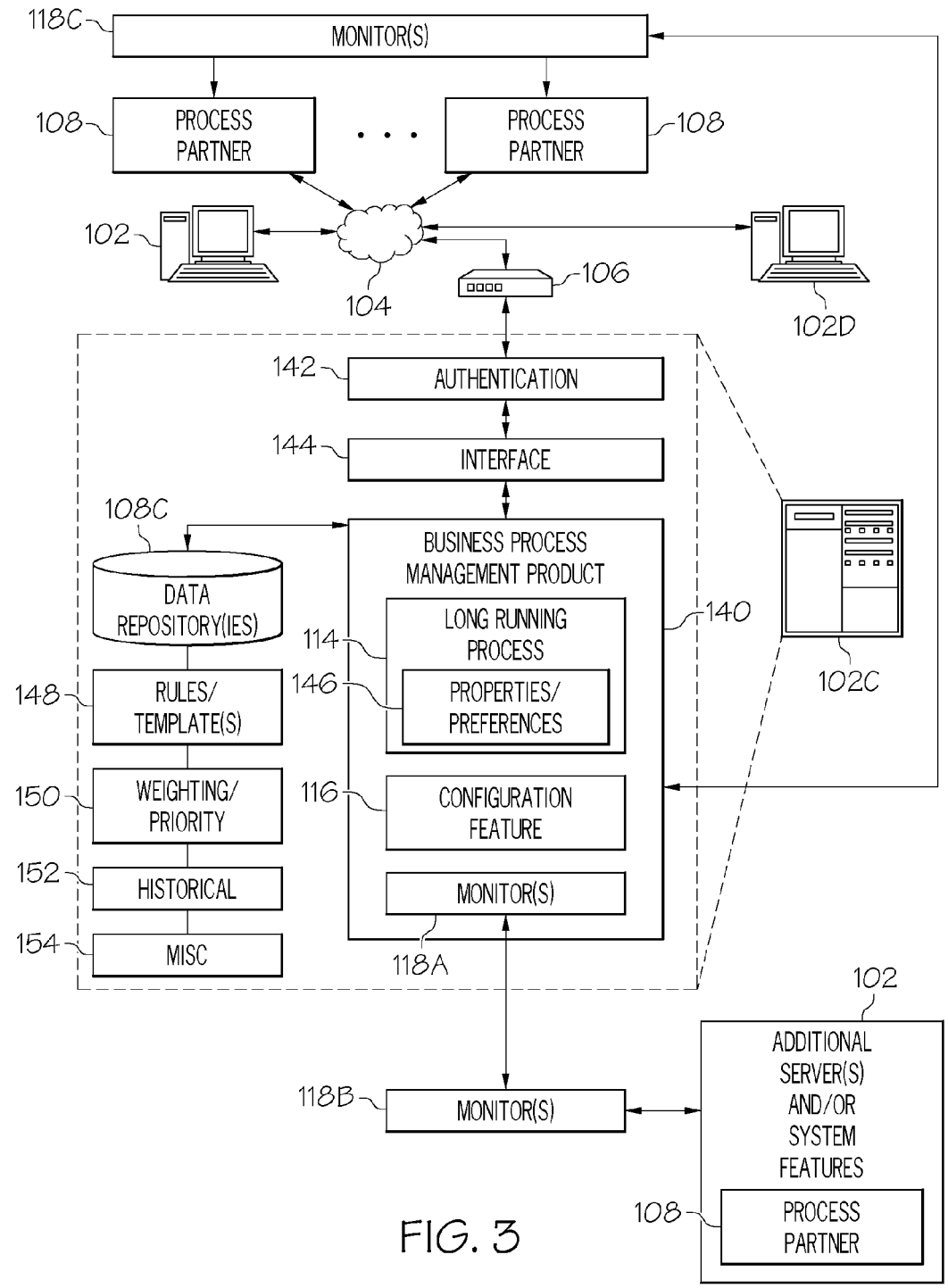
FIG. 3 is a block diagram illustrating systems and tools for improving the consistency of long running processes according to various aspects of the present invention.

Referring to FIG. 3, systems and methods for improving data consistency, e.g., in long running processes, is illustrated according to various aspects of the present invention. As illustrated, the processing device 102C supports hardware and software for implementing various business process workflows. In this regard, the processing device 102C may define a Business Process Management Server for supporting a Business Process Management Product 140. A user operating a processing device 102 such as a desktop, laptop, PDA, etc., accesses the Business Process Management product 140 on server 102C across an Intranet, Extranet, LAN or other suitable network 104. The user may also be a remote user that accesses the server 102C across the Internet.

For example, the user may execute a Web browser on a processing device 102 that communicates with the server 102C across the network 104. Communication between the processing device 102 and the server 102C may also be required to pass through one or more corresponding network communication devices 106 as described in greater detail herein, as well as other hardware and/or software devices, such as an authentication scheme 142 and/or interface 144. For example, access to the Business Process Management Product 140 may be via an Internet Web Server, Intranet server, Portal Application or other arrangement that may require authentication and/or an interface for user interaction.

Additionally, the Process Management Product 140 may include features typical to such applications, including for example, workflow rules, business rules, workflow tools, a business process engine, a business modeler, etc. The Business Process Management Product 140 may also interact with other servers and/or features 102 within an enterprise, such as document management servers, file servers, Internet Web servers, Mail servers, administration tools, other interfaces, etc., which are designated generally as 102.

In an illustrative implementation, the Business Process Management product 140 is configured, e.g., via a design-time programming environment, to implement a long running process 114. The long running process 114 is programmed via a product configuration feature 116 to prevent the long running process or a range of process steps within the long running processes 114 from executing unless/until all process partners required by the long running process 114 (or identified range thereof) are available.

According to various aspects of the present invention, an instance of the long running process 114 may be monitored by a first monitor 118A, which may monitor the application itself, and/or process partners that are locally supported by the Business Process Management application 140. The long running process 114 may also rely upon additional process partners, which are external to the application. In this regard, the external process partners may reside within a LAN, enterprise or other logical grouping and may be monitored by a system monitoring product 118B.

As yet a further example, one or more process partners may be accessed from across the Internet, and may be provided from a third party. In this regard, the process(es) may be monitored by one or more system monitor(s) 118C. Thus, in the exemplary implementation, each process partner 108 is monitored by a corresponding monitoring product 118A, 118B, 118C, e.g., for availability, status or other relevant parameters. As such, in the illustrative exemplary implementation, a process solution that improves data consistency in long running processes 114 is integrated with local and/or external monitoring of process partners.

According to aspects of the present invention, information collected by the monitoring product(s) 118A, 118B, 118C may be integrated into decisions of the Business Process Management application 140 utilizing an application and system monitoring product such as the IBM Tivoli Monitoring family of products, also by International Business Machines of Armonk, N.Y.

As noted in greater detail herein, the process designer may utilize tools, such as a configuration facility, to describe runtime behavior of process steps so the that the Business Process Management server 102C does not start a long running process instance or specified range of process steps thereof, unless all associated process partners are available. According to various aspects of the present invention, the "do not start process instance" functionality may be implemented based upon a property and/or preference 146. For example, in the process of evaluating the availability of process partners, the Business Process Management Product 140 may utilize rules, rule templates 148, weights and/or priorities 150, historical information 152 and/or other miscellaneous information 154 to make appropriate decisions. Examples of properties and preferences will be described in greater detail herein.

Figure 4:
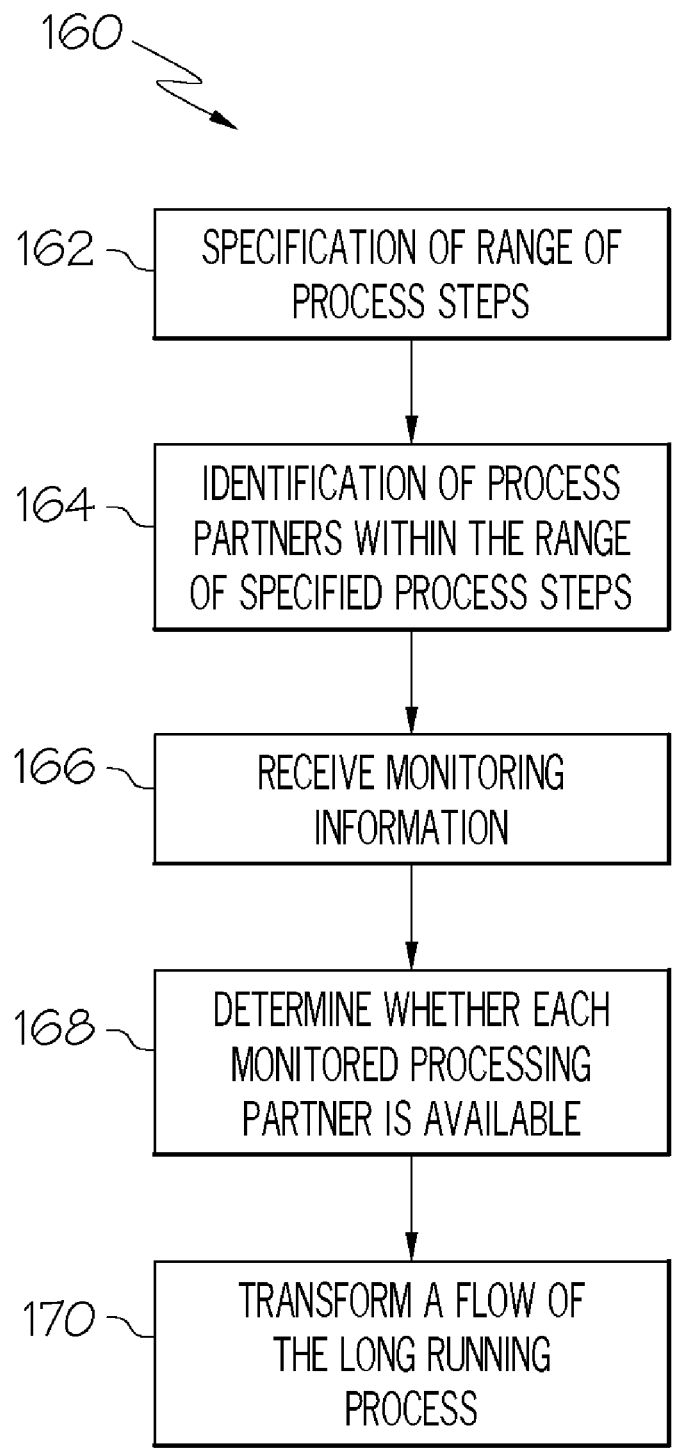
FIG. 4 is a flow chart illustrating a method of improving the consistency of long running processes according to various aspects of the present invention.

With reference to FIGS. 3 and 4 generally, a method 160 of dynamically adapting long running computer implemented processes comprises specifying or otherwise receiving a specification of a range of process steps at 162. For example, the method at 162 may comprise receiving at a process server computer, a specification of a range of process steps in a long running computer implemented process that carries out at least a portion of an associated business workflow, where the long running process is designed for execution in a corresponding computing environment. In this regard, a process designer, user, etc., may specify a range of process steps in a long running computer implemented process 114 executed by the process server computer 102C in the computing environment 100. As an illustration, a process designer may specify a range of process steps that may include at least one of the full long running process 114, a sub-process of the long running process 114 or a set of steps, one or more groups or steps, a range of steps, etc., within the computer implemented, long running process 114, which is carried out by the Business Process Management application 140 executed by the server 102C.

The method 160 also comprises identifying or otherwise receiving the identification of process partners 108 within the range of specified process steps at 164. As an example, the method at 164 may comprise receiving at the process server computer, an identification of computer-implemented process partners that are associated with the execution of the long running process within the range of specified process steps. Thus, each of the computer-implemented process partner(s) 108 that are associated with the execution of the long running process 114 within the range of specified process steps is identified. Moreover, at 166, monitoring information is received at the process server computer, which is collected with regard to at least one identified process partner. Thus for example, monitors 118 may be utilized to electronically acquire monitoring information collected with regard to at least one identified process partner 108.

The method 160 also comprises determining whether each monitored process partner 108 is available at 168. For example, the method at 160 may comprise determining whether each monitored process partner is available for providing a service via data communication before initiating execution of the specified range of process steps in an instance of the long running computer implemented process. Thus, computer-implemented processes may be utilized to automatically determine whether each monitored process partner 108 is available before initiating execution of the specified range of process steps in an instance of the long running computer implemented process 114.

The method 160 may further transform the flow of the long running process at 170. For example, the method at 170 may comprise transforming a flow of the long running computer implemented process based at least in part upon the determination as to whether each monitored process partner is available for providing a service via data communication. Thus, a flow of the long running computer implemented process 114 may be transformed based at least in part upon the determination as to whether each monitored process partner 108 is available. For example, the method may implement a completion action, e.g., indicating approval to execute the associated long running process 114, if each of the process partners 108 associated with the execution of the long running process 114 within the range of specified process steps are available. The method may alternatively implement a trigger action that automatically modifies the flow of the long running process 114 to not execute the specified range of process steps if at least one process partner 108 associated with the specified range of process steps is unavailable.

In a non-limiting, but illustrative example, the process partners associated with a corresponding long running process 114 may comprise Web services that are called by a process engine. In this regard, a process engine "knows" the services that it calls. The process engine further has access some status of the services it will call, e.g., via the monitor(s) 118C. These services might be down (unavailable), running slow or in other states. Moreover, a breakdown in communications channels to these services may make one or more services temporarily unavailable. However, according to the present invention, data consistency errors are avoided if one or more of the associated services are unavailable because the long running process or identified section thereof, is not executed.

In yet another non-limiting, but illustrative example, a process engine, e.g., associated with the Business Process Management server may know what process partners it will call or the process engine may know the probability that a process partner from a set of process partners will be called. For example, the process engine or another process may be configured to dynamically select the process partners to be used based upon one or more metrics, including for example, the status of the process partners 118, as observed by the associated monitor 118A, 118B and 118C. However, such factors may be considered before starting execution of the long running process 114, or identified range thereof so as to avoid data consistency errors across two or more systems.

By way of illustration, and not by way of limitation, other exemplary process partners may comprise programmatic, computer implemented services that perform functions such as invoking a Web service, updating a data base, making a Systems Applications and Products (SAP) call, making a Service Component Architecture (SCA) call, placing a service request, e.g., work on a work queue for performance by a human being, machine or other entity, etc. The service request could be synchronous or asynchronous.

If one of the process partners to be invoked is unavailable at run time or at some other specified time, a response, e.g., a trigger action 132 (as described with reference to FIG. 2) may comprise waiting for the process partner to become available. Other response actions may be to compensate or rollback the steps in the business process to return to an earlier state. Numerous situations may arise however, where is more desirable never to have started the process instance if it was known that a necessary process partner was not available. This might be true for the process as a whole, a sub-process, or some set of the steps in the process or sub-processes.

In a computer driven business process, there are reasons to wait at other points than that of failure. For example, resources or "Time Slots" might be tied up in waiting, rather than being applied to a valuable process that could be finished earlier.

Figure 5:
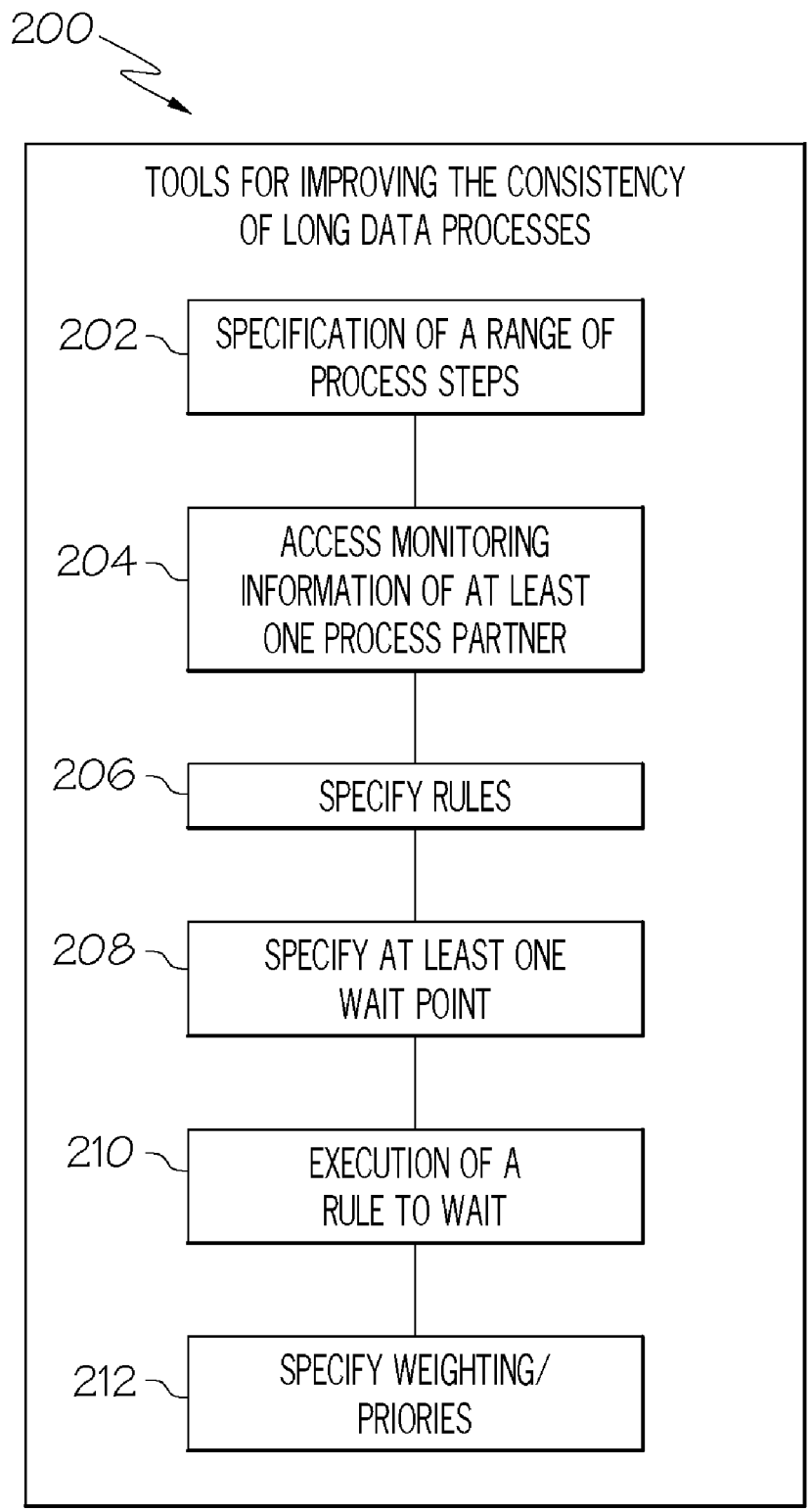
FIG. 5 is a block diagram illustrating tools for improving the consistency of long running processes according to various aspects of the present invention.

Various aspects of the present invention include a process server and/or tools to address issues related to data consistency in long running computer processes. Referring to FIG. 5, a hybrid block diagram/flow diagram illustrates several tools 200 that may be utilized in addressing issues related to data consistency in long running computer processes according to various aspects of the present invention.

The tools may include a first tool that is utilized by the process designer to specify a range of processing steps at 202. In this regard, the range of processing steps may define, for example, a full process, a sub-process, a set of steps, etc. The specified range of processing steps may be selected, for example, where there is the potential in a long running process for data consistency problems should some fault manifest during execution of the long running process. However, other factors may also be considered when specifying the range of processing steps, such as by grouping steps based upon logic, function, organization, location or other parameters.

Figure 6:
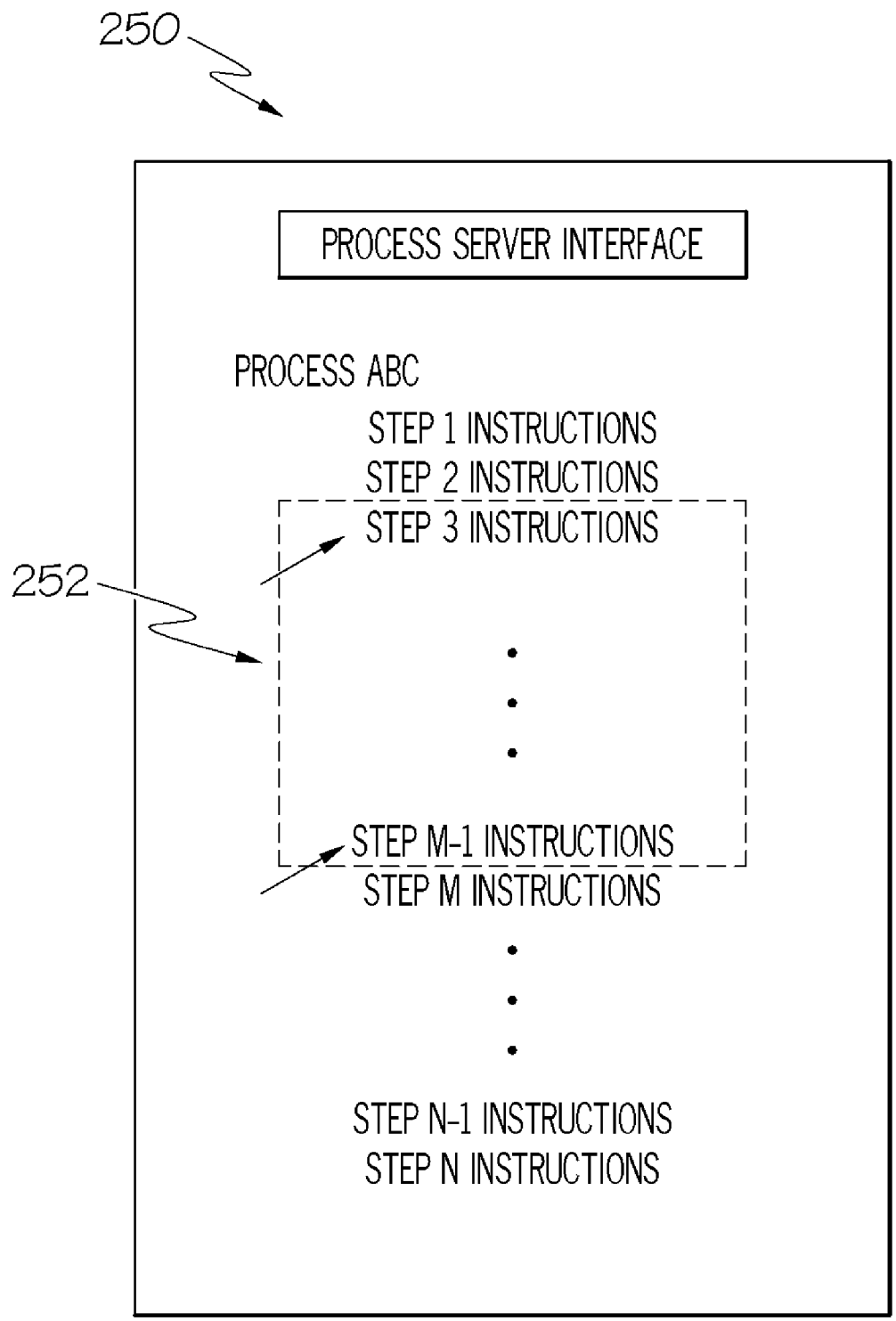
FIG. 6 is an illustration of a graphical user interface for implementing tools for improving the consistency of long running processes according to various aspects of the present invention.

With brief reference to FIG. 6, the first tool 202 may be implemented as part of a graphical user interface 250. The graphical user interface 250 may be utilized to specify a range of process steps in a long running computer implemented process executed by a process server computer in a computing environment by graphically displaying steps in a corresponding overall process and enabling a user to specify the range. For example, a user may be able to specify the range by selecting first and last steps thus defining the specified range of process steps. The steps illustrated in FIG. 6 are illustrated as sequential steps for purposes of clarity of illustration only. However, in practice, the specified range of process steps may comprise, for example, sequential steps, branches, parallel execution, other non-sequential steps and/or combinations thereof. Accordingly, the graphical user interface may provide alternative range selection tools to receive a specification of a desired range.

As illustrated in FIG. 6, a Process 'ABC' includes a plurality of process steps. The graphical user interface 250 has provided a list of the process steps, e.g., by listing the instructions or some other indicia of the process steps. The user may specify first and last steps at 252 by clicking a first step and a last step in the graphically displayed range. The user may also and/or alternatively specify the range using other graphical tools to identify a desired range at 252, e.g., by lassoing the range, windowing the range or otherwise graphically defining the start, end and/or content of the range.

Referring back to FIG. 5, a second tool 204 provides the ability to access monitoring information of at least one process partner associated with the specified range. As illustrated with regard to block diagram in FIGS. 1 and 3, one or more monitors 118 may be utilized to collect information with regard to process partners associated with process steps implemented in workflows of the Business Process Management system. For example, one or more local monitors 118 may evaluate the status of processes locally maintained, or otherwise supported by the business enterprise. Additionally, monitors 118 may be utilized to monitor process partners that are remotely located, and/or independently controlled. For example, monitors 118 may be utilized to collect information with regard to and/or from process partners implemented as Web services across the Internet.

Figure 7:
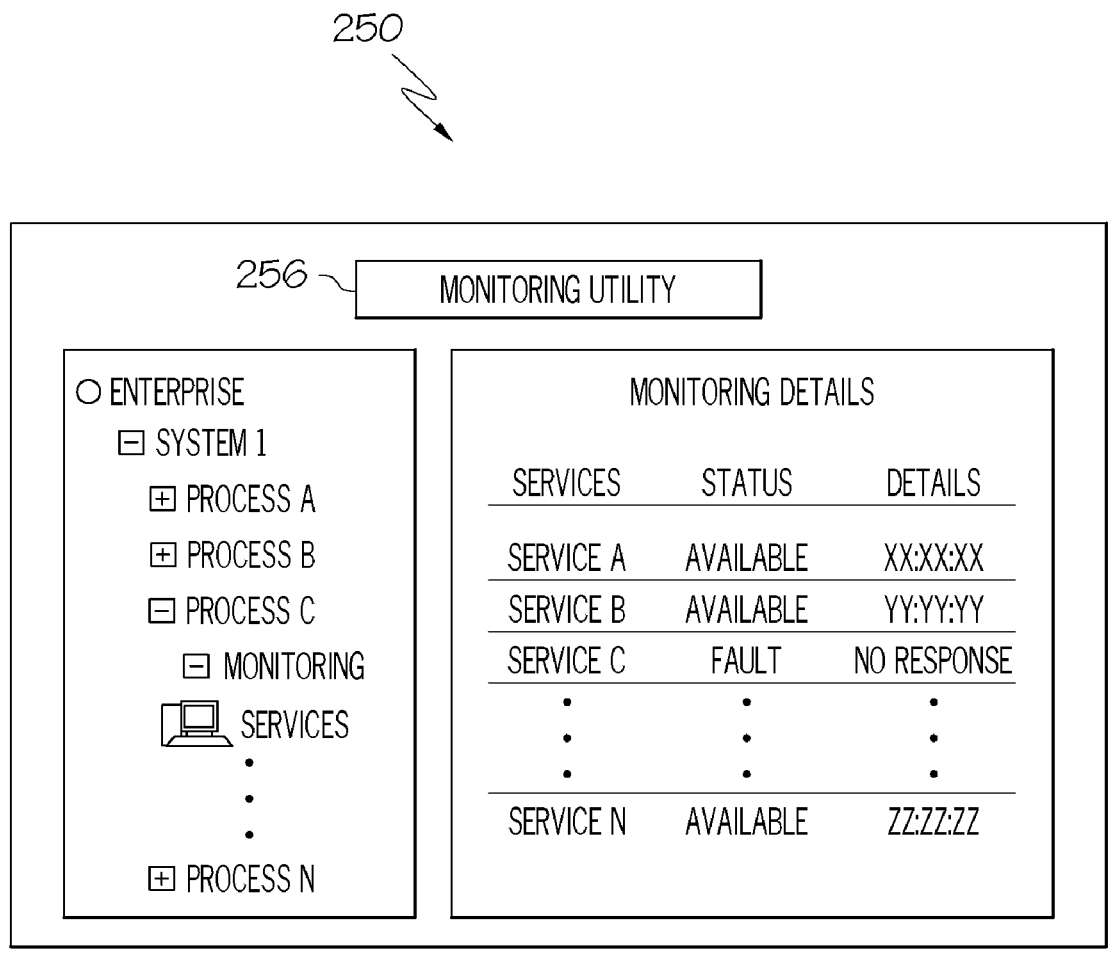
FIG. 7 is an illustration of a graphical user interface for implementing tools for improving the consistency of long running processes according to further aspects of the present invention.

Referring briefly to FIG. 7, the graphical user interface 250 may also provide a monitoring utility 256 for monitoring details of information collected from, by or on behalf of the monitors 118. The monitoring information associated with process partners, e.g., Web services, is accessed by a graphical "drill down" as illustrated. The Monitoring utility can be implemented, for example, in a manner analogous to an interface such as Tivoli Enterprise Portal, by International Business Machines of Armonk, N.Y. Moreover, other forms of data presentation may alternatively be implemented.

In the graphical user interface screen presented for purposes of illustration, a user has drilled down to reveal details with regard to the monitoring of process partners, e.g., Web services associated with Process C. In the Monitoring Details box, the detailed status of a plurality of Services is illustrated. For purposes of discussion, Service C has a fault indication. As such, if Service C is utilized as part of a selected range of process steps of a long running process 114, the system will know not to begin execution of the long running process or other designated sub range thereof.

Referring back to FIG. 5, a tool 206 includes mechanisms that provide the ability to specify rules using at least one piece of monitoring information collected from the monitors 118. For example, established rules may be evaluated against information returned from one or more monitors to facilitate decision support. Thus, for example, a rule may be utilized to conclude that a process partner such as a Web service required to implement a process step is unavailable even though that Web service is technically accessible on line, because, for example, use of the Web service would violate terms of a service level agreement, etc.

In this regard, the rules may be provided in any form. Moreover, evaluation of rules in the affirmative and/or in the negative may be used to indicate that the associated process partner is unavailable. Moreover, rules may comprise simple or complex structures. Still further, a decision with regard to whether a process partner is available or not may be determined based upon either complete or incomplete information. For example, a rule may require that each of a number of predicates must be satisfied before determining that the process partner is available. Failure of one of the predicates may thus trigger a determination that the process partner is unavailable, despite having incomplete information to assess the entirety of the predicates of the rule.

Thus, a computing process may be utilized to determine whether each monitored process partner is available by evaluating at least one rule using at least one piece of acquired monitoring information to determine whether to transform the flow of the long running computer implemented process.

According to aspects of the present invention, a "rules template" can be automatically generated from the process partners used and the possible states they can be in. In this regard, a user may be prompted to include at least some Boolean combination of the process partners and their respective states.

Thus, the system may dynamically adapt long running computer implemented processes by automatically generating a rules template from process partners that are utilized (or have a probability of being utilized) by the process and by enabling a user to enter logic describing at least one process partner and its respective state to define a rule utilized to automatically determine whether each monitored process partner is available before initiating execution of the specified range of process steps.

Still further, according to various aspects of the present invention, rules may be evaluated based upon other forms of information associated with process partner(s). For example, with reference to FIG. 3 generally, factors such as past performance, existing resources reservations and the like may be considered. That is, analysis of rules may take into consideration, historical data obtained from previous service monitoring records, e.g., utilizing historical data 152.

By way of illustration, if an analysis of historical data 152 predicts a congestion or performance measure for a process partner step or sub process, this measure can be used in defining a rule. Similarly, if a capacity planning function has been exercised, or a reservation system employed, then predictions of a performance measure of a process partner step or sub process can be used in these steps. For a simple example, if a process is related with the performance of a set of periodic backups, then running the process when one system is engaged in end of quarter processing would not be optimal.

Referring back to FIG. 5, a fourth tool 408 may be provided to specify at least one wait point, e.g., as implemented by the trigger action 132 (FIG. 2). Thus, the system may dynamically adapt long running computer implemented processes by graphically representing the overall process and by enabling a user to click on the graphically represented process to select a wait point for waiting in response to implementation of the trigger action.

As such, the flow of the long running process may be automatically modified to not execute a specified range of process steps by specifying at least one wait point. If a process partner associated with the specified range is unavailable, the process flow at run time is directed to wait at the wait point without executing the long running process or identified range thereof. The system may wait until each process partner associated with the specified range of process steps is available for processing. Alternatively, other actions may be implemented, depending upon the requirements of the corresponding logic.

Figure 8:
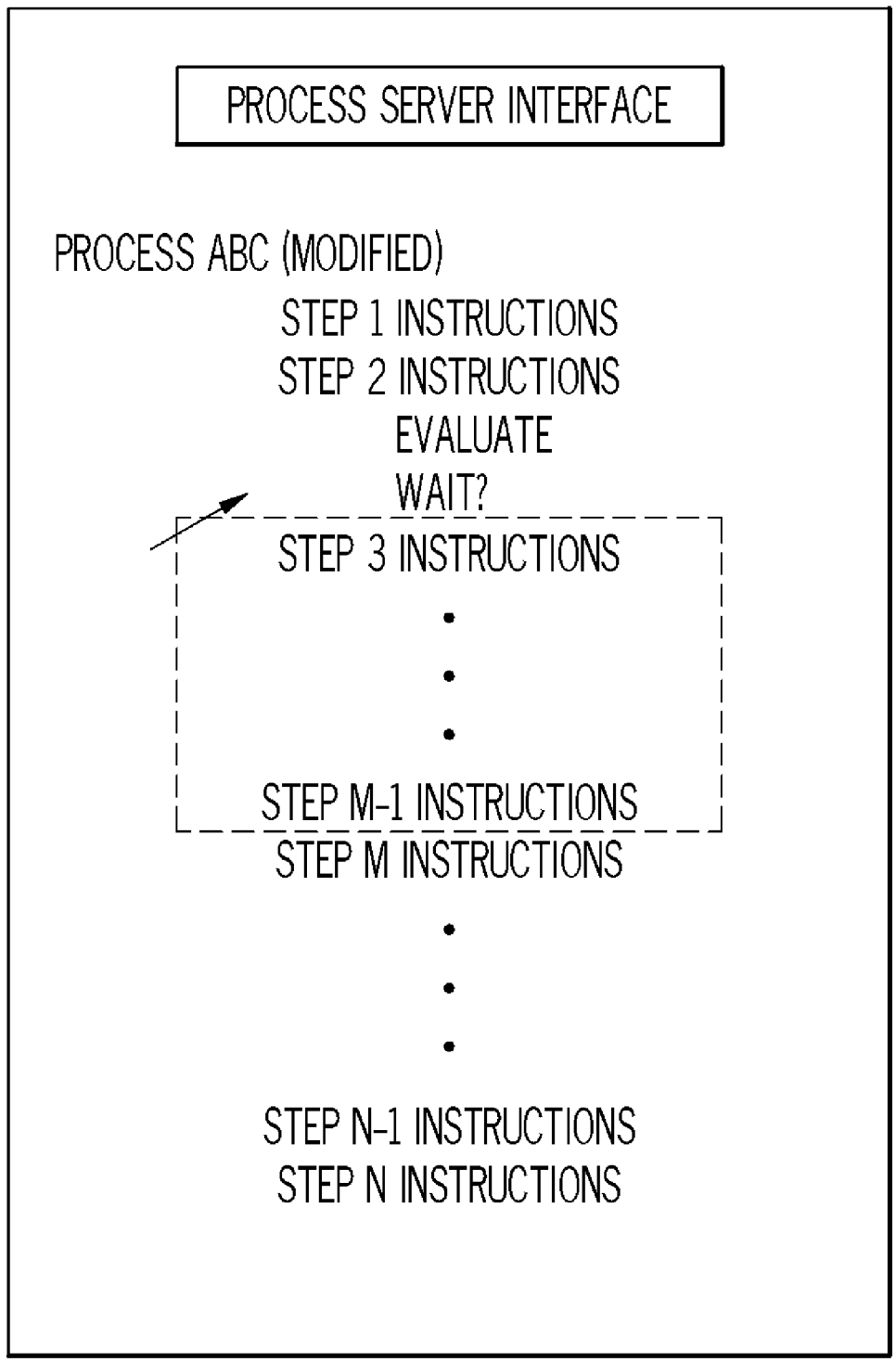
FIG. 8 is an illustration of a graphical user interface for implementing tools for improving the consistency of long running processes according to various aspects of the present invention.

The wait point may comprise a place in the execution of the computer-implemented software process where the process can wait for the unavailable process partner(s) to become available. Referring briefly to FIG. 8, the Process 'ABC' has been augmented to include steps to evaluate the specified range of process steps in the long running process and to define a wait point, as indicated by the arrow in the hypothetical screen shot. For example, the wait point can be specified by clicking on a graphical presentation of the process. In practice, the point of evaluation and the point of waiting need not be the same.

As noted above, there may be implementation advantages to wait at a point other than the point of failure. According to aspects of the present invention, upon detecting a fault in one or more process partners, a wait location may be established at any upstream point in processing relative to the detected faulty process step. In this regard, the wait point may be located at a process step within the selected range of processing steps but upstream of the process partner fault. As another illustrative example, the wait point may be positioned at a point just before the start of the selected range of process steps. As yet a further example, the wait may precede even the first step of the overall process, such that the process does not even begin. As such, the wait may be implemented in any suitable location in the process.

Still further, once a decision has been made to implement a wait, the wait process may be implemented in any number of suitable ways. As a few illustrative examples, the wait may time out, after which the process is aborted in whole, or in part. Still further, the process may decide to wait indefinitely, e.g., where the successful completion of the selected process steps is critical, and/or where there are no other processing or time constraints imposed upon the operation.

Referring back to FIG. 5, according to further aspects of the present invention, a fifth tool 212 may enable rules to be utilized to evaluate trigger action events, including the execution of waiting. For example, if it is determined that at least one process partner is unavailable for execution of a selected range of process steps, a wait may be implemented to see if the faulty process partner becomes available. One or more rules may thus be evaluated to control the wait event. For example, rules may be processed to determine where in the overall process to wait, for how long to wait, where to go after waiting, etc.

According to still further aspects of the present invention, a sixth tool 212 may include the ability to specify weighting and/or priories based upon process behavior. For example, predicates to the rules evaluated to determine whether a process partner is available, in response to a trigger event, e.g., a wait process, etc., may be weighted and/or prioritized based upon the behavior of the process. The behavior of the process should be interpreted expansively, and may thus include monitoring the behavior of a subpart of an overall process, the entirety of the overall process, the context in which the overall process or subpart thereof is executed, etc.

The weighting and/or priority may also be utilized to modify decision making set out more fully herein based upon weighting and/or priority that is static or dynamically changing. For example, the ability to specify weighting and/or priorities may be based upon process behavior as it manifests. Thus, the state, context or other parameters may be considered, e.g., at the time of instantiation of the process, at the time of execution of the process, etc.

According to various aspects of the present invention, at least one additional process may be triggered in response to determining that at least one process partner associated with the specified range of process steps is unavailable. For example, the additional process may include sending a message, sending a response to a display, invoking a service and calling another process, etc.

Further, the tools 200 may include the ability to trigger at least one process or sub-process. In this regard, the ability to trigger at least on process or sub-process may be related to any feature described more fully herein. By way of illustration, the tools may provide the ability to trigger a process or sub-process according to a corresponding trigger event. For example, a trigger event may cause the initiation of a wait process, e.g., to wait for a process partner to become available. In this regard, the process or sub-process may execute the waiting associated process in real time with the execution of the process. The waiting process may also trigger a notification, e.g., to perform at least one of sending an e-mail, sending a message, sending a response to a display, sending an instant message (IM), invoking a Web service, calling another process, etc. Processes or sub-processes may also be triggered to obtain additional/different monitoring information, modify rules, policies, weighting, priority etc. Still further, the system may trigger a process or sub-process to evaluate aspects of rules, etc. Still further, processes may be called to locate replacement process partners, select alternate branches of processing or perform other actions.

According to various aspects of the preset invention, at least one of weighting and priorities is specified based upon process behavior, wherein determining whether each monitored process partner is available further comprises evaluating at least one specified weighting or priority in view of behavior of the long running process as it manifests. In this regard, transforming a flow of the long running computer implemented process comprises transforming the flow of the long running process based at least in part upon the evaluation of at least one specified weighting or priority in view of behavior of the long running process as it manifests.

Figure 9:
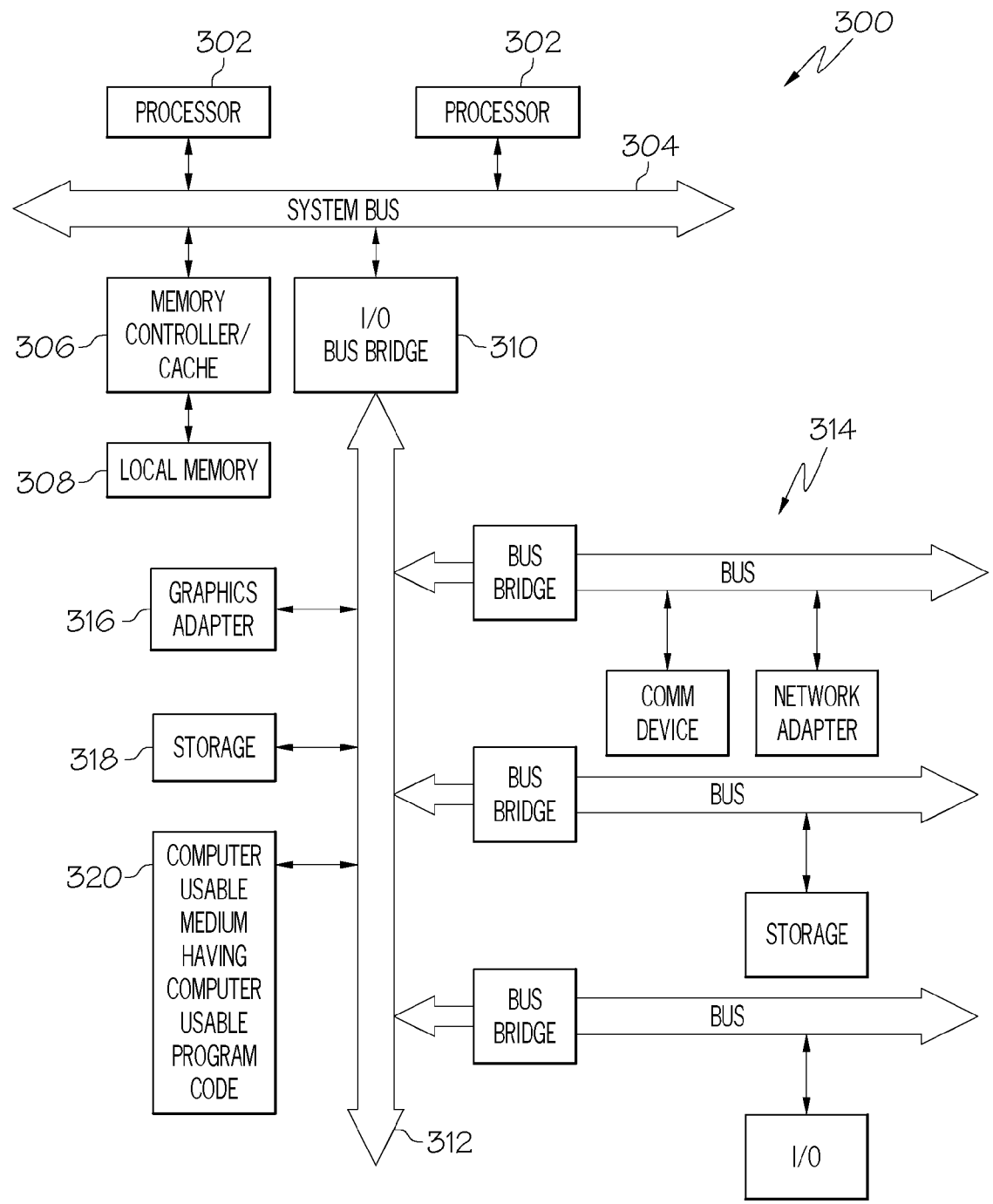
FIG. 9 is a block diagram of an exemplary computer system including a computer readable storage medium having computer readable program code embodied therewith, where the exemplary computer system is capable of executing a computer program product to improve the consistency of long running processes according to various aspects of the present invention set out in greater detail herein.

Referring to FIG. 9, a block diagram of a data processing system 300, e.g., which may be implemented in any of the processing devices 102 described more fully herein. The data processing system 300 may comprise a symmetric multiprocessor (SMP) system or other configuration including a plurality of processors 302 connected to system bus 304. Alternatively, a single processor 302 may be employed. Also connected to system bus 304 is memory controller/cache 306, which provides an interface to local memory 308. An I/O bus bridge 310 is connected to the system bus 304 and provides an interface to an I/O bus 312. The I/O bus may be utilized to support one or more network adapters 314, as well as optionally, one or more busses and corresponding devices, such as bus bridges, input output devices (I/O devices), storage, etc.

Also connected to the I/O bus may be devices such as a graphics adapter 316, storage 318 and a computer usable medium 320 having computer readable program code embodied thereon. The computer readable program code may be utilized, for example, to implement the features and aspects of the various aspects of the present invention as described more fully herein.

The data processing system may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. More specific examples of the computer usable or computer readable storage medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or a storage device.

A data processing system suitable for storing and/or executing program code may include at least one processor coupled directly or indirectly to memory elements, e.g., through a system bus or other suitable connection. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of dynamically adapting long running computer implemented processes comprising:
receiving at a process server computer, a specification of a range of process steps in a long running computer implemented process that carries out at least a portion of an associated business workflow, wherein the long running process is designed for execution in a corresponding computing environment;
receiving at the process server computer, an identification of one or more computer-implemented process partners that are associated with the execution of the specified range of process steps in the long running computer implemented process;
receiving monitoring information at the process server computer, which is collected with regard to at least one identified process partner;
determining whether each monitored process partner is available for providing a service via data communication before initiating execution of the specified range of process steps in the long running computer implemented process; and
transforming a flow of the long running computer implemented process based at least in part upon the determination as to whether each monitored process partner is available for providing a service via data communication by:
implementing a completion action to execute the specified range of process steps in the long running computer implemented process if the one or more process partners associated with the execution of the specified range of process steps are available; and
implementing a trigger action that automatically modifies the flow of the long running process to not execute the specified range of process steps if at least one process partner associated with the specified range of process steps is unavailable.

2. The method according to claim 1, wherein the specification comprises at least one of a full process, a sub-process or a set of steps within a process.

3. The method according to claim 1, wherein determining whether each monitored process partner is available comprises:
evaluating at least one rule using at least one piece of received monitoring information to determine whether to transform the flow of the long running computer implemented process.

4. The method according to claim 1, wherein transforming a flow of the long running computer implemented process comprises:
receiving a specification of at least one wait point to wait until each process partner associated with the specified range of process steps is available for processing; and
transforming the long running process to transition flow to the specified wait point in response to at least one process partner associated with the specified range of process steps being unavailable.

5. The method according to claim 1, further comprising:
triggering at least one additional process in response to determining that at least one process partner associated with the specified range of process steps is unavailable.

6. The method according to claim 5, wherein:
triggering at least one additional process comprises at least one of sending a message, sending a response to a display, invoking a service and calling another process.

7. The method according to claim 1, further comprising:
receiving at least one of weighting and priority based upon process behavior;
wherein:
determining whether each monitored process partner is available further comprises:

evaluating one or more of the received at least one of weighting or priority in view of behavior of the long running computer implemented process as it manifests; and transforming a flow of the long running computer implemented process further comprises:

transforming the flow of the long running computer implemented process based at least in part upon the evaluation of the at least one weighting or priority.

8. The method according to claim 1, wherein receiving at a process server computer, a specification of a range of process steps in a long running computer implemented process comprises:

graphically displaying steps of an overall process of at least a portion of the associated business workflow; and enabling a user to specify the range of process steps by specifying the first and last steps of the specified range of process steps.

9. The method according to claim 1, further comprising:

graphically representing an overall process of at least a portion of the associated business workflow; and enabling a user to click on the graphically represented process to select a wait point for waiting in response to implementation of the trigger action.

10. The method according to claim 1, further comprising:

automatically generating a rules template from the process partners that are utilized by the long running computer implemented process; and enabling a user to enter logic describing at least one process partner and its respective state to define a rule utilized to automatically determine whether each monitored process partner is available for service before initiating execution of the specified range of process steps.

11. A computer program product to dynamically adapt long running computer implemented processes comprising:

a computer readable storage medium having computer readable program code embodied therewith, the computer readable program code comprising:

computer readable program code configured to receive a specification of a range of process steps in a long running computer implemented process, wherein the long running process is designed for execution by a process server computer operating in a corresponding computing environment;

computer readable program code configured to receive an identification of one or more computer implemented process partners that are associated with the execution of the specified range of specified process steps in the long running computer implemented process;

computer readable program code configured to receive monitoring information collected with regard to at least one identified process partner;

computer readable program code configured to determine whether each monitored process partner is available before initiating execution of the specified range of process steps in the long running computer implemented process; and computer readable program code configured to transform a flow of the long running computer implemented process based at least in part upon the determination as to whether each monitored process partner is available, including:

computer readable program code configured to implement a completion action to execute the specified range of process steps in the long running computer implemented process if the one or more process partners associated with the execution of the specified range of process steps are available; and computer readable program code configured to implement a trigger action that automatically modifies the flow of the long running process to not execute the specified range of process steps if at least one process partner associated with the specified range of process steps is unavailable.

12. The computer program product according to claim 11, wherein the specification comprises at least one of a full process, a sub-process or a set of steps within a process.

13. The computer program product according to claim 11, wherein the computer readable program code configured to determine whether each monitored process partner is available comprises:

computer readable program code configured to evaluate at least one rule using at least one piece of received monitoring information to determine whether to transform the flow of the long running computer implemented process.

14. The computer program product according to claim 11, wherein the computer readable program code configured to transform the flow of the long running process to not execute a process step within the specified range of process steps comprises:

computer readable program code configured to receive a specification of at least one wait point to wait until each process partner associated with the specified range of process steps is available for processing; and computer readable program code configured to transform the long running process to transition flow to the specified wait point in response to at least one process partner associated with the specified range of process steps being unavailable.

15. The computer program product according to claim 11, further comprising:

computer readable program code configured to trigger at least one additional process in response to determining that at least one process partner associated with the specified range of process steps is unavailable.

16. The computer program product according to claim 15, wherein:

the computer readable program code configured to trigger at least one additional process comprises computer readable program code configured to trigger at least one of sending a message, sending a response to a display, invoking a service and calling another process.

17. The computer program product according to claim 11, further comprising:

computer readable program code configured to receive at the process server computer a specification of at least one of weighting and priority based upon process behavior;

wherein:

the computer readable program code configured to determine whether each monitored process partner is available further comprises:

computer readable program code configured to evaluate one or more of the received at least one weighting or priority in view of behavior of the long running computer implemented process as it manifests; and the computer readable program code configured to transform a flow of the long running computer implemented process further comprises:

computer readable program code configured to transform the flow of the long running computer implemented process based at least in part upon the evaluation of the at least one weighting or priority.

18. The computer program product according to claim 11, wherein the computer readable program code configured to specify a range of process steps in a long running computer implemented process executed by a process server computer in a computing environment comprises:
   computer readable program code configured to graphically display steps of an overall process of at least a portion of the associated business workflow; and
   computer readable program code configured to enable a user to specify the range of process steps by specifying the first and last steps of the specified range of process steps.

19. The computer program product according to claim 11, further comprising:
   computer readable program code configured to graphically represent an overall process of at least a portion of the associated business workflow; and
   computer readable program code configured to enable a user to click on the graphically represented process to select a wait point for waiting in response to implementation of the trigger action.

20. The computer program product according to claim 11, further comprising:
   computer readable program code configured to automatically generate a rules template from the process partners that are utilized by the long running computer implemented process; and
   computer readable program code configured to enable a user to enter logic describing at least one process partner and its respective state to define a rule utilized to automatically determine whether each monitored process partner is available before initiating execution of the specified range of process steps.

* * * * *